United States Patent

[11] 3,623,518

| [72] | Inventor | Joseph P. Nicotra<br>Syracuse, N.Y. |
|---|---|---|
| [21] | Appl. No. | 17,760 |
| [22] | Filed | Mar. 9, 1970 |
| [45] | Patented | Nov. 30, 1971 |
| [73] | Assignee | Rockwell Manufacturing Company<br>Pittsburgh, Pa. |

[54] ANTISPLINTER INSERT FOR PORTABLE SAWS
6 Claims, 6 Drawing Figs.

[52] U.S. Cl. .................................................. 143/43 A,
143/132 F, 143/160, 143/68 E
[51] Int. Cl. .................................................. B27b 9/00
[50] Field of Search .......................................... 143/43, 43
A, 43 C, 43 D, 43 E, 43 F, 68 E, 68 F, 160, 163,
132, 132 F

[56] References Cited
UNITED STATES PATENTS
| 2,854,043 | 9/1958 | Raymond .................. | 143/43 F |
| 2,996,089 | 8/1961 | McCarty ................... | 143/68 E |

Primary Examiner—Donald R. Schran
Attorney—Strauch, Nolan, Neale, Nies & Kurz

ABSTRACT: A portable circular saw antisplintering insert for removable association with the shoe plate of the saw including a plate formed with an edge opening slot and designed to firmly bear upon the upper surface of a workpiece in close adjacent relation to the sides and tips of the emerging cutting teeth to prevent tearing and chipping of the upper lamination or formica or like covering of the workpiece and assure a clean finish cutting of such workpieces.

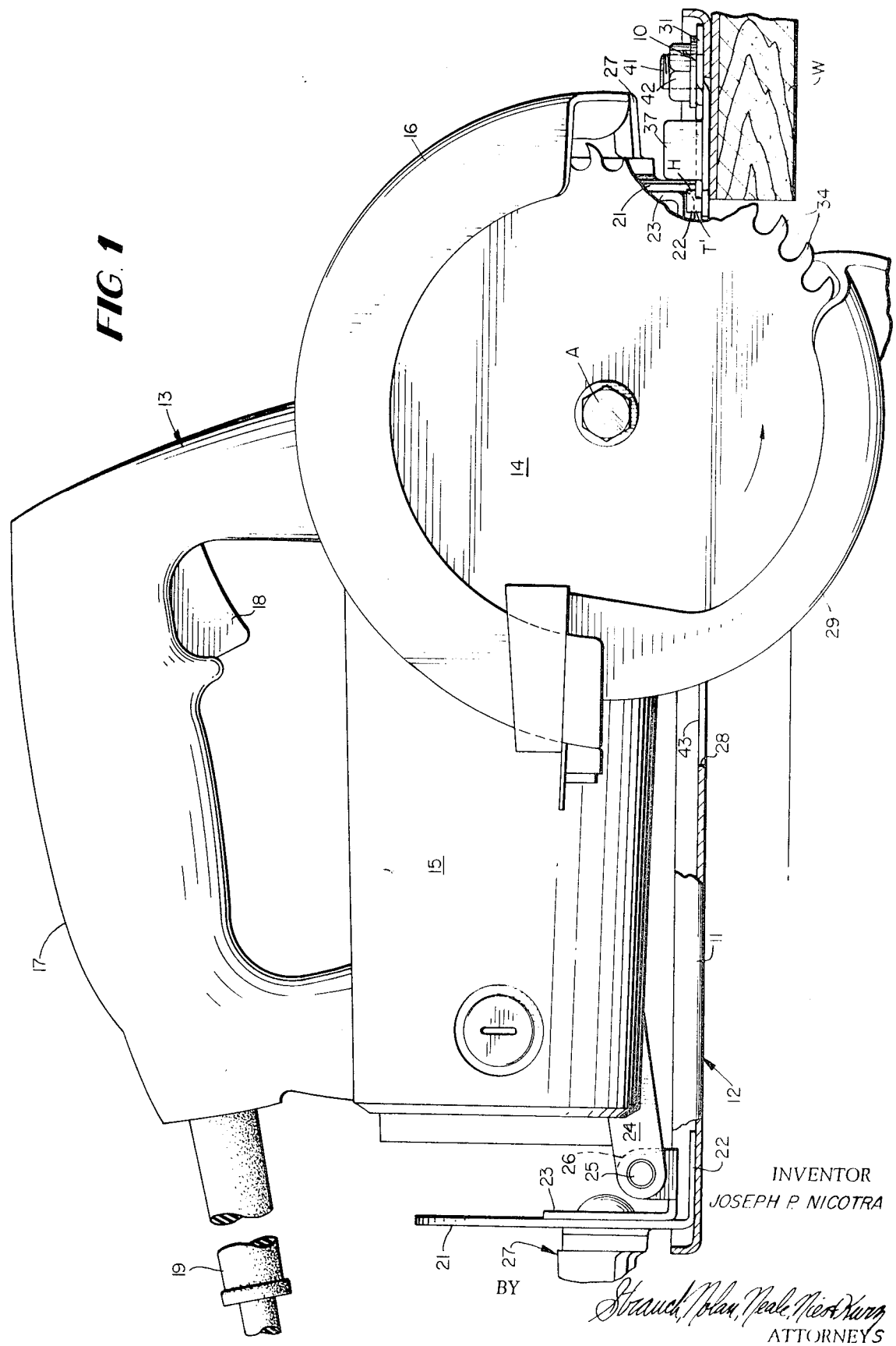

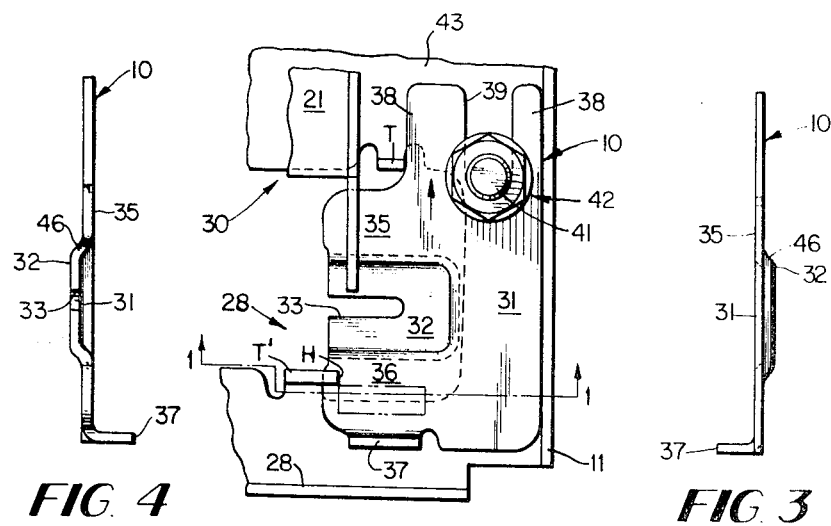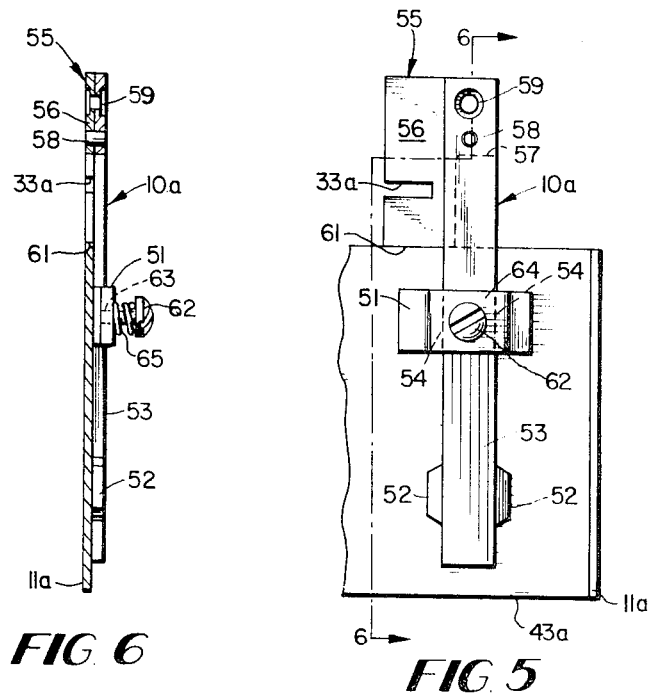

ANTISPLINTER INSERT FOR PORTABLE SAWS

BACKGROUND OF THE INVENTION

The subject invention is concerned with improving the quality of cutting of portable power-driven circular saws to assure a finish cutting of laminated stock such as plywood-, formica-, or like-covered sink, table tops and the like. In the construction of such saws, the motor and motor housing, including a handle for holding and guiding the saw, are mounted on a base assembly providing a shoe plate adapted to slidingly engage the upper surface of the workpiece and the saw blade is arranged to rotate around an axis spaced above the workpiece and rearwardly of the point of engagement of the saw teeth with the workpiece. To minimize the force required to accurately feed the saw along a line of cut scribed on the upper surface of the workpiece, a counterclockwise rotation of the blade is provided so that the blade teeth enter the workpiece at the underside of the workpiece and cut upwardly through the workpiece. This cutting action tends to draw the shoe plate firmly against the upper face of the workpiece relieving the operator of the need to hold the saw down against the workpiece. As a consequence, the operator need only apply a forward feeding force to the saw while guiding the saw along the scribed line of cut exposed to view at the leading edge of the cut either through a window opening in the shoe plate or beyond a side edge of the shoe plate depending upon the design of the shoe plate employed. In either case, the teeth cutting upwardly through the workpiece and striking the upper lamination or formica covering from below at a point where the upper surface is uncovered have a tendency to chip or splinter the upper finished surface. As a consequence, the intended highly finished surface is objectionably marred and in most cases cannot be restored satisfactorily.

SUMMARY OF THE INVENTION

This invention overcomes the objectionable feature of portable circular saws by providing a removable antisplintering insert in the form of a plate member fixedly mounted on the shoe plate and having an edge opening slot dimensioned to closely enclose the toothed periphery of the saw and delimited by bearing surfaces designed to firmly engage the upper surface of the workpiece closely adjacent the sides of the emerging saw teeth.

An important object of the present invention is to provide an antisplintering insert for portable circular saws in which the bearing surfaces lie in the plane of the undersurface of the shoe plate or slightly below to assure a firm engagement with the upper surface of the workpiece along the opposite edges of the forming saw kerf.

A further object of the present invention is to provide an antisplintering insert for portable circular saws which is of simple construction yet adapted for quick and easy attachment to and removal from the shoe plate of a circular saw base assembly.

Still another object of the present invention resides in providing an antisplintering insert for portable circular saws which is firmly and nonshiftably secured to the shoe plate of a portable circular saw base assembly.

Further objects will appear from the following description and appended claims when read in conjunction with the accompanying drawings.

BRIEF DESCRIPTION OF THE DRAWINGS

FIG. 1 is a side elevational view of a conventional portable circular saw illustrating the base assembly in partial section substantially along line 1—1 of FIG. 2 to illustrate a preferred form of the antisplintering insert of the present invention;

FIG. 2 is a top plan view of the antisplintering insert of FIG. 1 assembled with the shoe plate, the front end only of which is illustrated;

FIG. 3 is a right side elevational view of the antisplintering insert of FIG. 2;

FIG. 4 is a left side elevational view of the antisplintering insert of FIG. 2;

FIG. 5 is a fragmental top plan view of a portable circular saw shoe plate provided with a modified form of antisplintering insert of the present invention; and FIG. 6 is a sectional view taken along line 6—6 of FIG. 5 looking in the direction of the arrows.

DESCRIPTION OF THE PREFERRED EMBODIMENT OF THE INVENTION

With continued reference to the drawings where the same reference numerals are used through the several views, the numeral 10 generally indicates the antisplintering insert of the present invention. Insert 10 is illustrated in FIG. 1 applied to shoe plate 11 of base assembly 12 of a conventional circular saw 13 the saw blade 14 of which rotates in the direction of the arrow around the axis A of the saw drive shaft (not shown). Saw 13 includes motor housing 15 which fixedly mounts stationary blade guard 16 in conventional manner and provides handle 17 housing in conventional manner trigger control switch assembly 18 and power leads (not shown) connecting the motor through switch assembly 18 to the electrical supply conduit 19 in well-known manner.

Motor housing 15 is pivotally connected at its rear end to an upstanding, laterally arcuately extending bracket 21 fixedly welded through base leg 22 to shoe plate 11 by means of a hanger bracket 23 and link 24. Link 24 is pivotally connected at one end (not shown) to motor housing 15 and at its other end to pivot pin 25 carried by upstanding ear 26 of hanger bracket 23 which is in turn adjustably clamped to laterally arcuately extending bracket 21 by a clamp bolt and thumb nut assembly 27 cooperating with a conventionally provided arcuate slot (not shown) in bracket 21. The forward end of motor housing 15 is similarly connected to a laterally arcuately extending bracket 21 and hanger bracket 23 adjustably clamped together by a similar clamp bolt and thumb nut assembly 27. These connections permit relative angular adjustment of shoe plate 11 and blade 14 to effect bevel cutting in well-known manner.

It will be clear to those skilled in the art that brackets 21 and these connections are so designed that tilting of motor housing 15 and saw blade 14 occurs around an axis lying along the line of intersection of the saw blade with the center plane of the shoe plate. It follows that irrespective of the angle of cut shoe plate 21 will always be disposed for full surface engagement with the upper surface of the workpiece and the line of intersection defining the tilt axis will always remain fixedly and unchangeably related to the shoe plate, a factor of importance to the present invention as will presently appear.

As best seen in FIG. 2, shoe plate 11 is provided with an opening 28 through which the lower portion of blade 14 and the conventional movable blade guard 29 project. This opening 28 also serves as a window opening through which the operator can view the scribed marking on the workpiece so as to guide the saw along the desired line of cut. Opening 28 adjacent its forward end (see FIG. 2) is provided along edge 30 with an upstanding tab T and along the edge opposite edge 30 at a point offset rearwardly from tab T is provided with an upstanding tab T′ having a forwardly directed hook extension H the bottom edge of which is spaced above the top face of plate 11 a distance slightly in excess of the plate thickness of insert 10. The purpose of tabs T and T′ will be hereinafter pointed out.

Insert 10, preferably formed of low-carbon steel, as best seen in FIGS. 3 and 4, has a main planar plate body 31 of generally rectangular configuration provided along its rear edge with a depressed area 32 having a centered slot 33 opening through the rear plate edge and extending forwardly at right angles to the rear plate edge for a distance of the order of one-half an inch to a closed arcuate end. Depressed area 32, which lies wholly within the forward end of shoe plate opening 28 is of a depth of 0.085 to 0.095 inches, just slightly greater than the 0.074 to 0.078 inch thickness of plate 11 to assure that its bottom face lies slightly below the plane of the undersurface of shoe plate 11. This dimensional difference is provided to assure a firm downward pressure on the upper face of the workpiece immediately adjacent the sides and ends of the emerging saw teeth 34 which slot 32 encompasses in use of insert 10. The slot 33 is of a width sufficient to just pass the peripherally disposed teeth 34 of saw blade 14 and of a length slightly greater than the radial length of teeth 34 and the rear edge of depression 32 is inset from the rear edge of insert 10 a maximum of one sixty-fourth of an inch for a purpose to be presently pointed out.

The main plate body forwardly of depressed area 32 overlies the forward portion of shoe plate 11 which delimits opening 28 and is provided at the forward corner of side 35 of plate body 31 with a pair of laterally extending spaced arms 38 lying in the plane of plate body 31 and defining a slot 39 the inner end of which is of arcuate configuration and is dimensioned to freely receive the shank of a stud 41 end butt welded to the upper face of shoe plate 11. The marginal edge of opposite side 36 of insert 10 abuttingly overlies the portion of shoe plate 11 defining opening 28 immediately forwardly of tab T' with its rear edge lying beneath hook extension H and in abutting contact with the forward edge of tab T' and the rear edge of the rearwardly disposed arm 38 in abutting contact with the forward edge of tab T when insert 10 is placed in position with arms 38 receiving stud 41 as will be clear from an inspection of FIGS. 1 and 2. To enable ready handling of insert 10 for assembly the laterally disposed edge of side 36 of the insert is provided with an upstanding flange or lip 37. It follows that, with proper relative positioning of tabs T and T', or tab T' alone, and stud 41, insert 10 will be positively positioned for limited lateral adjustment relative to saw blade 14 in a predetermined right angular path relative to blade 14 to assure radial clearance of saw teeth 34. The limited lateral adjustment permits insert 10 to be shifted laterally to establish proper side clearance of saw teeth 34 to accommodate minor variances in the rotational plane of blade 14 occasioned by tolerance variations in the mounting of the blades on the blade arbor. Once insert 10 is properly adjusted laterally, a clamp nut and washer 42 (FIGS. 1 and 2) threaded on stud 41 and shoe plate 11. Furthermore, the washer and nut assembly 42 together with hook extension H of tab T' also assure firm bearing engagement of depressed area 42 with the workpiece at all times and resist any tendency of the cutting forces to raise or flex insert 10 during operation.

Assembly of insert 10 is accomplished by loosening or removing washer and nut assembly 42, grasping flange 37 of insert 10 between the fingers, placing the insert in position with arms 38 straddling stud 31 and main body edge 36 in superposed abutting engagement with body portion 43 of shoe plate 11 forwardly of tab T', rotating insert 10 clockwise around stud 41 as seen in FIG. 2 to engage main body edge 36 beneath hook extension H and rearmost arm 38 with the forward edge of tab T, and threading washer and clamp nut 42 home to clamp the portions of arms 38 adjacent stud 41 against the upper face of shoe plate 11.

Ready disassembly of insert 10 may be effected by reversing the assembly steps when the nature of the workpiece is such that splintering will not occur or roughing cuts are being made using the saw.

In use, teeth 34 of saw blade 14 rotating counterclockwise as seen in FIG. 1 will enter the workpiece W along an upward and forwardly inclined path and emerge from the top surface of workpiece W within slot 33 of insert 10. Since the slot defining portions of the bottom wall of depressed area 32 will be in firm bearing contact with the upper surface of workpiece W immediately adjacent the sides and tips of the emerging saw teeth 34 any tendency of the upper lamination, formica or like covering of workpiece W to be separated from the main body of workpiece W will be prevented. A clean cutting emergence of saw teeth 34 is thereby assured by the present invention so that a finish cut top surface will result.

DESCRIPTION OF ALTERNATE EMBODIMENT OF INVENTION

Certain portable circular saws now in use are provided with shoe plates having a transverse tubular guide (See U. S. Pat. No. 1,848,330 to Emmons) for mounting a rip gage in the form of amounting rod or flat strip carrying at one end a member having a depending flat faced lug designed to slide along the edge of a workpiece and guide the saw so as to rip strips of uniform width therefrom. An interchangeable antisplintering insert may be readily provided for use with such guide-equipped shoe plates by providing a slotted platelike member on the end of the mounting rod or flat strip for assembly with the shoe plate tubular guide. Such an insert is disclosed in FIGS. 5 and 6 where the shoe plate mounted guide comprises a bridge member 51 welded or otherwise fixed to shoe plate 11a adjacent its forward end and a pair of upstanding ribs 52 laterally spaced from bridge member 51 and disposed to form an open ended guide passage transversely aligned with the passage provided by bridge member 51. As shown in FIGS. 5 and 6, insert 11a comprises a flat mounting strip 53 of low-carbon steel dimensioned to closely slidingly cooperate with the interval sidewalls 54 of bridge member 51 and the opposing vertical walls of ribs 52 and fixedly carrying at its outer end a plate member 55 having an edge opening slot 33a.

While plate member 55 may assume any desired shape and may be fixed to the end of mounting strip 53 in any suitable manner, the present invention contemplates a main plate body 56 of generally rectangular configuration having an attachment area 57 formed at the outer end of the plate edge opposite that containing slot 33a. Plate area 57 as shown underlies the end of strip 53 and it and strip 53 are provided with a through drilled opening adapted to receive a force fit locating pin 58 and a pair of aligned oppositely directed counterbores disposed outwardly of pin 58 to receive a so-called "Chicago Rivet" 59 for fixing plate 55 in tight butting engagement with the underside of the outer end of strip 53.

Assembly of insert 10a is effected by sliding strip 53 axially through the passage in bridge member 51 and between ribs 52 until the inner edge 61 of plate 55 abuts the opposing edge of shoe plate 11a and threading set screw 62 downwardly through a suitably tapped opening 63 formed midway in the bridging wall 64 of bridge member 51 to clamp strip 53 against the underlying main body portion 43a of shoe plate 11a. Preferably a heavy coil spring 65 is interposed between the head of set screw 62 and bridging wall 64 to lock set screw 62 against loosening due to vibration in use.

The thickness of plate 55 is chosen to equal or just slightly exceed the thickness of shoe plate 11a to assure a firm bearing contact of the undersurface of plate 55 on the upper surface of the workpiece as heretofore described in connection with the preferred embodiment of the invention. In all other respects the operation of the insert of this embodiment is the same as the preferred embodiment.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters patent is:

1. In a portable power-driven circular saw of the type having a base assembly including a shoe plate, a circular saw blade protruding downwardly beyond the shoe plate, a motor housing mounting a motor drive connected to said saw blade, and means on said shoe plate and said motor housing for mounting said motor, motor housing and blade, the improvement which comprises:

a. an antisplintering insert in the form of a plate member having an edge opening slot dimensioned to closely receive the peripheral toothed edge of said saw blade and delimited along its opposite sides and closed end by workpiece-engaging bearing surfaces, said plate member comprising a main body portion of generally U-shaped configuration in plan and said workpiece engaging bearing surfaces comprising a depressed area lying within the arms of the U-shaped body configuration with said slot therein; and b. means, including a plate extension comprising a pair of spaced, laterally directed arms lying in the plane of said body portion, and mating clamp means on said shoe plate adjacent the leading edge of said circular saw blade for removably clamping said insert to said shoe plate in operative correlation to said leading edge of said circular saw, said mating clamp means comprising a stud on said shoe plate and an associated clamp nut whereby said insert may be clampingly engaged with the upper face of said shoe plate upon tightening said clamp screw.

2. The improvement of claim 1 wherein said shoe plate is provided with at least one abutment tab to contact the rear edge of said insert adjacent the leading edge of said saw blade to prevent angular shifting of said insert around said stud into contact with the saw blade due to the reaction forces acting on the insert as a result of its engagement with the workpiece.

3. The improvement of claim 1 wherein said abutment tab includes a hook extension overlying a portion of said insert rear edge to prevent upward deflection of said insert relative to its clamped end due to said reaction forces.

4. An antisplintering insert for a portable power-driven circular saw having a base assembly including a shoe plate adapted to slidably support the saw upon the upper face of a workpiece and a circular saw blade extending below the shoe plate and having peripherally disposed saw teeth, comprising a main support member having a mounting extension adapted for removable attachment to the upper surface of the shoe plate and a dependent plate portion defining a workpiece engaging bearing surface in the plane of the lower surface of the shoe plate formed with an edge opening slot disposed to straddle the peripherally disposed saw teeth, said slot defining portions of said dependent plate surface being disposed to closely enclose the sides and tips of the saw teeth and have firm bearing contact with the upper surface of the workpiece immediately adjacent the developing kerf formed by the saw blade.

5. The antisplintering insert of claim 4, wherein the insert is a one-piece platelike member, said mounting extension comprises a pair of spaced arms extending from one side of said platelike member at right angles to said edge opening slot and defining a slot for receiving a clamp screw, and said dependent plate surface comprises a depressed area of said plate formed along the trailing edge of said one-piece platelike member.

6. The antisplintering insert of claim 5, wherein said one-piece platelike member at the side remote from said one side is formed with an upstanding flange adapted to serve as a finger holding protuberance in assembling and disassembling the insert.

* * * * *